United States Patent [19]

Schreffler

[11] Patent Number: 5,212,263
[45] Date of Patent: May 18, 1993

[54] TEXTURED EPOXY POWDER COATING

[75] Inventor: Dean A. Schreffler, Hamburg, Pa.

[73] Assignee: Morton International, Inc., Chicago, Ill.

[21] Appl. No.: 639,628

[22] Filed: Jan. 10, 1991

[51] Int. Cl.$^5$ .................. C08G 59/14; C08L 63/00
[52] U.S. Cl. ..................... 525/533; 525/526; 525/934
[58] Field of Search .............. 525/533, 526, 934

[56] References Cited

U.S. PATENT DOCUMENTS

| | | | |
|---|---|---|---|
| 3,996,175 | 12/1976 | Schreiber et al. | 523/427 |
| 4,341,819 | 7/1982 | Schreffler et al. | 525/533 |
| 4,528,127 | 7/1985 | Holderegger et al. | 525/934 |
| 4,677,170 | 6/1987 | Monnier | 525/539 |
| 4,701,378 | 10/1987 | Bagga et al. | 525/486 |
| 4,757,117 | 7/1988 | Moss | 525/934 |
| 4,997,951 | 5/1991 | Bagga | 548/352 |
| 5,021,513 | 6/1991 | Bagga | 525/504 |

*Primary Examiner*—John C. Bleutge
*Assistant Examiner*—Randy Gulakowski
*Attorney, Agent, or Firm*—Wayne E. Nacker; Gerald K. White

[57] ABSTRACT

A powder coating composition forming a textured finish comprises epoxy resin, methylene disalicylic acid and an imidazole Bisphenol A epoxy resin.

6 Claims, No Drawings

TEXTURED EPOXY POWDER COATING

The present invention is directed to powder coatings which are applied to a substrate in powder form and then fused to form a continuous coating. More particularly, the invention is directed to powdered coating compositions used to form a textured finish.

BACKGROUND OF THE INVENTION

The coating compositions of this invention are dry, free-flowing powders that may be used in fusion coating processes. "Fusion coating processes" are here defined as those coating processes in which coating powders are distributed over a substrate (which may be hot or cold); and heat, supplied from the substrate or an external source, fuses the powders into a continuous film. Examples of fusion coating processes include fluidized bed, electrostatic spraying, hot flocking (with or without electrostatic spray), and cloud chambers. When coating powders are based upon heat curing resins, as is the case of the epoxy resins of this invention, sufficient heat in excess of that required to fuse the powders must be available to cure the coatings and fully develop their physical and chemical properties.

Powder coating compositions are known in the art which produce textured or wrinkled finishes. For example, U.S. Pat. No. 4,341,819, the teachings of which are incorporated herein by reference, describes an epoxy powder coating composition useful for producing wrinkle finishes.

Current techniques in formulating textured powder coatings require balancing particle size, resin-viscosity and filler loadings to restrict the melt flow of the material thereby causing a coating surface with various degrees of orange peel or texture. Uniformity of texture is somewhat difficult to achieve and control on a consistent basis due to normal variations in raw materials and processing. Many of these formulations are difficult to apply electrostatically because of the high filler concentrations needed to produce the desired texture.

The present invention is directed to an epoxy powder composition which provides a coating of consistent texture that is relatively independent of viscosity and filler loadings. It is also directed to a powder coating composition which may contain lower levels of fillers and therefore has improved charging characteristics that minimize "fall-off" during electrostatic coating. Other advantages of the coating composition of the invention will become more apparent with reference to the following description of the invention.

SUMMARY OF THE INVENTION

A powder coating composition includes epoxy resin, methylene disalicylic acid as a curing agent and as a cure catalyst which is an adduct of an imidazole and a Bisphenol A epoxy resin. The combination of the curing agent and cure catalyst provide a curing rate that ensures a finish of predictable texture.

DETAILED DESCRIPTION OF CERTAIN PREFERRED EMBODIMENTS

The epoxy resins used in the present invention are Bisphenol A epoxies with epoxide equivalent weights of between about 600 and about 1100, or mixtures of such epoxies. Most preferably, the major portion, i.e., over about 50% of the epoxy resin, is an epoxy resin with an equivalent weight from between 600 to 750.

The curing agent is methylene disalicylic acid (MDA), as described in the above-referenced U.S. Pat. No. 4,341,819; however, unlike in that patent, the composition herein produces a grainy textured finish, rather than a wrinkled finish. MDA is used at between about 15 and about 25 parts per hundred resin (phr), preferably between about 16 and about 20 phr and more preferably in the range of about 18 phr.

In accordance with the present invention, in addition to the MDA, an additional cure catalyst or accelerator is employed which is an adduct of imidazole or a substituted imidazole and a Bisphenol A type epoxy resin. The imidazoles which are adducted to the epoxy resin have the general formula:

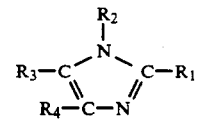

wherein $R_1$, $R_2$, $R_3$ and $R_4$ are H or any substitution which is non-reactive with the epoxy resin; the R's, if not H typically being alkyl, aryl, or alkaryl. Suitable imidazoles include, for example, but are not limited to imidazole, 2-methyl imidazole, 2-phenyl imidazole and mixtures thereof. Although applicants are not bound to any theory, it is believed that an imidazole adducts to epoxy resins by an opening of the epoxy ring that results in the epoxy oxygen bonding to the C=N bond of the imidazole ring. The adducted imidazole acts as a catalyst, moving from epoxy group to epoxy group as it facilitates epoxy group ring opening and epoxide cure reactions. Imidazoles in themselves tend to be insoluble in epoxy resins; thus, the purpose of adducting the imidazoles to the epoxy resin is to introduce the imidazole in a compatible fashion to the epoxy system. In cure catalysts in accordance with the present invention, the imidazole or substituted imidazole residue comprises between about 5 and about 50 wt. % of the imidazole/epoxy resin adduct. A suitable imidazole-type adduct of a Bisphenol A epoxy resin is sold under the tradename XU HT 261 by CIBA-GEIGY Corporation. It is believed that the rapidity of cure promoted by the addition of this catalyst ensures that the coating cures soon after sufficient levels of the powder coating have fused to form a continuous film, while the finish retains some of the texture provided by the powder granules, as applied. The imidazole/epoxy resin cure catalyst is used at between about 1 and about 5 phr and preferably between about 2.5 and about 4 phr. Because the texture is chemically controlled, rather than mechanically controlled, e.g., viscosity controlled, the texture of the coating produced is less dependent upon the particular batches of ingredients used and less dependent on storage stability.

Preferably, the composition also contains a flow control agent, such as a polyalkylacrylate flow promoter, in the range of between about 0.5 and about 1.0 phr.

As in previous textured powder coating compositions, the composition generally contains pigments and fillers. However, because the texture that results is not significantly dependent upon filler levels, substantially lower levels of fillers may be employed and still obtain textured coatings. Whereas, prior art textured coating compositions typically require between about 100 and about 120 phr filler to achieve the texture, compositions in accordance with the invention may have filler phr's in the range of 25. Low filler levels, i.e., below about 55 phr particularly desirable for electrostatic coatings. Fillers tend to be detrimental to the charging characteristics of powder coating compositions, sometimes resulting in significant fall-off and poor corner penetration.

The lower levels of filler required for the coating compositions address the problem of charging characteristics. Also, lower filler levels reduce the specific gravity, resulting in greater coverage per amount of coating composition. On the other hand, fillers are generally inexpensive relative to the other components, and conventional higher filler levels may be utilized in lower-cost compositions.

The components of the powder coating are melt-blended in a conventional manner, typically in an extruder. Melt blending is generally carried out in the temperature range of about 80° C.-120° C., which is substantially lower than typical cure temperatures, i.e., from about 180° C. to about 220° C. Although some curing may take place during the melt-blending, the composition remains curable during later fusion at higher temperatures. The composition, after cooling, is ground, e.g., in a Brinkman mill or a Bantam Hammer mill, to a particular size. The particulate size determines the coarseness or fineness of the texture of the coating that is produced. Generally, the particle sizes range from 40 to 100 standard mesh, depending upon the desired texture.

The invention will now be described in greater detail by way of specific example.

EXAMPLE

Black and Grey coating compositions contained the following components in phr

| Ingredient | Black | Grey |
| --- | --- | --- |
| Epoxy resin A[1] | 85.0 | 85.0 |
| Epoxy resin B[2] | 15.0 | 15.0 |
| Methylene disalicylic acid (hardener) | 18.0 | 18.0 |
| Ciba Geigy XU HT 261 (hardener) | 2.5 | 2.5 |
| Praments and fillers | <55.0 | <55.0 |

[1]Bisphenol A/Epichlorohydrin epoxy resin with an epoxide equivalent weight of 600–750.
[2]Bisphenol A/Epichlorohydrin epoxy resin with an epoxide equivlaent weight of 800–950. containing 5% polyalkylacrylate flow promoter.

The ingredients were premixed in a Henschel blender. Then the ingredients were melt-blended in a PR-46 Buss extruder; zone 1 at 60° C., feed set at 6; zone 2 at 82° C., feed set at 98. The resulting composition, when solidified, was ground in a Brinkman Lab mill to particle sizes of 40, 70 and 100 standard mesh.

Precleaned steel test panels (from "Q" Panel Co.) of about 3"×6"×0.032 " (7.6 cm×15.2 cm×0.08 cm) were coated using standard electrostatic spray techniques and baked in an oven at a temperature of about 190° C. for 10 minutes.

The resulting coatings had the following characteristics:

| | |
| --- | --- |
| CURE RATE = | 190° C. for 10.0 min. |
| COATING THICKNESS = | Coarse texture = 2.5–4.0 mils. |
| | Fine texture = 2.0–3.0 mils. |
| GLOSS = | Coarse texture = 2% |
| | Fine texture = 6% |
| | measured at a 60° angle. |
| PENCIL HARDNESS = | "H" |
| ⅛" MANDREL BEND = | Good - no cracking |
| CROSSHATCH ADHESION = | Good - no removal of 1/16 inch squares |
| 1.0 MIN. ACETONE RUB = | Slight rub off |

While the invention has been described in terms of certain preferred embodiments, modifications obvious to one with ordinary skill in the art may be made without departing from the scope of the present invention.

Various features of the invention are set forth in the following claims.

What is claimed is:

1. A coating powder for forming a grainy textured finish which is a particulate form of a composition comprising epoxy resin, between about 15 and about 25 phr methylene disalicylic acid and between about 1 and about 5 phr of a cure catalyst which is an adduct of imidazole or a substituted imidazole and a Bisphenol A epoxy resin, the residue of said imidazole comprising between about 5 and about 50 wt. % of said adduct.

2. A composition according to claim 1 further containing between about 0.5 and about 1.5 phr of a flow control agent.

3. A composition according to claim 1 wherein said epoxy resin is selected from epoxy resins having epoxy equivalent weights of between about 600 and about 1100 and mixtures of such epoxy resins.

4. A composition according to claim 1 wherein at least about 50% of said epoxy resin has an epoxide equivalent weight in the range of 600–750.

5. A composition according to claim 1 wherein said composition contains fillers and pigments.

6. A composition according to claim 5 containing between about 25 and about 55 phr fillers and pigments.

* * * * *